United States Patent
Maeda

[19]
[11] Patent Number: 6,098,685
[45] Date of Patent: Aug. 8, 2000

[54] TAPE APPLICATION DEVICE

[75] Inventor: Tsuyoshi Maeda, Tokyo, Japan

[73] Assignee: Lintec Corporation, Tokyo, Japan

[21] Appl. No.: 09/192,399

[22] Filed: Nov. 16, 1998

[30] Foreign Application Priority Data

Nov. 17, 1997 [JP] Japan .................................. 9-315075

[51] Int. Cl.⁷ .................................................. B32B 31/00
[52] U.S. Cl. .......................... 156/391; 156/574; 156/579
[58] Field of Search ............................ 156/391, 574, 156/579, 523, 540, 486

[56] References Cited

U.S. PATENT DOCUMENTS

| | | |
|---|---|---|
| 3,814,643 | 6/1974 | Wagner . |
| 4,623,421 | 11/1986 | Cardin ..................... 156/579 |
| 5,045,146 | 9/1991 | Rundo ..................... 156/391 |
| 5,178,717 | 1/1993 | Rodriguez ............... 156/574 |
| 5,820,725 | 10/1998 | Maeda et al. ............. 156/391 |

FOREIGN PATENT DOCUMENTS

| | | |
|---|---|---|
| 51-135015 | 11/1976 | Japan . |
| 62-46780 | 2/1987 | Japan . |
| 2-221582 | 9/1990 | Japan . |
| 3-166068 | 7/1991 | Japan . |
| 5-65298 | 9/1993 | Japan . |
| 5-338627 | 12/1993 | Japan . |
| 533505 | 7/1939 | United Kingdom . |
| 588674 | 12/1944 | United Kingdom . |
| 2 247 002 | 2/1992 | United Kingdom . |
| 2 283 725 | 5/1995 | United Kingdom . |
| 2 320 485 | 6/1998 | United Kingdom . |

*Primary Examiner*—Geoffrey L. Knable
*Attorney, Agent, or Firm*—Finnegan, Henderson, Farabow, Garrett & Dunner, L.L.P.

[57] ABSTRACT

The present invention relates to a tape application device for applying a strip form adhesive tape along a tape application surface formed on a work, with removing from a release liner. The tape application device includes a roller supporting shaft fixed to a body at both ends, a roller rotatably mounted on the roller supporting shaft and wrapped thereover an adhesive tape, locating elements mounted on the main body and engaging with the body for movement along a tape application surface so that the roller is depressed onto the tape application surface, a tape guide plate hinged on the sub-body at the base end portion for pivoting, and fixing elements for fixing the tape guide plate so that a gap portion between the tape guide plate and the roller is defined for guiding the adhesive tape with the release liner. According to the present invention, the adhesive tape can be accurately attached onto the tape application surface without requiring qualified worker.

14 Claims, 8 Drawing Sheets

TAPE APPLICATION DEVICE

BACKGROUND OF THE INVENTION

1. Field of the Invention

The present invention relates to a tape application device for applying a strip form adhesive tape along a tape application surface formed on a work, with removing from a release liner. This application is based on Patent Application No. 9-315075 (1997) filed Nov. 17, 1997 in Japan, the content of which is incorporated hereinto by reference.

2. Description of the Related Art

Painting eggshell black on the inside and the outside of a door sash of an automotive vehicle is desirable for restricting reflection of light of the door sash as viewed externally, particularly from the side portion of a vehicle body to certainly provide a neat appearance of not only the interior, but also of the whole vehicle body.

For this purpose, conventional apparatuses spray paint eggshell black paint on the door sash portion of a vehicle. However, spray painting encounters various problems, such as by requiring investment for additional facility for maintaining an adequate work environment, taking a long period for drying paint, and so forth. As a solution for such drawback, Japanese Patent Application Laying-open No. 51-135015 (1976) or Japanese Patent Application Laying-open No. 62-46780 (1987) proposes application of eggshell black adhesive tape having high weather resistance and high wear resistance on a door sash portion, in place. In such case, as is well known, since the majority of the door sash portion of an automotive vehicle consists of a three-dimensional curved portion, the above-mentioned adhesive tape application apparatus inherently becomes large scale. Also, when such an adhesive tape application apparatus is installed in a practical production line, an investment for production line becomes huge. In addition, such an adhesive tape application apparatus has poor flexibility in adapting to modification of design of the door sash portion, and has poor general-purpose properties.

It can be considered that the operation for application of the adhesive tape is performed manually by the worker without using any device. However, in order to accurately perform applying operation at a speed adapted to the production line of the automotive vehicle, quite high skill is required.

Thus, there has been proposed in Japanese Patent Application Laying-open No. 5-338627 (1993), a tape application device which can easily and quickly perform application of the adhesive tape without requiring high skill of the worker. By employing the tape application device, the adhesive tape can be accurately applied at a predetermined position of the door sash portion easily and quickly without requiring high skill of the worker. In addition, apparatuses for automatically assembling a weather-strip onto the door sash, such as those disclosed in Japanese Patent Application Laying-open No. 2-221582 (1990), Japanese Patent Application Laying-open No. 3-166068 (1991) or Japanese Patent Application Publication No. 5-65298 (1993), may be employed.

In the conventional tape application device, disclosed in Japanese Patent Application Laying-open No. 5-338627 (1993), there is a right-cut device and a left-cut device adapted to a right side door and a left side door of the automotive vehicle. Therefore, in case of sedan type passenger vehicle, for example, four kinds of tape application devices, respectively, for a left front door, a left rear door, a right front door and a right rear door have to be used selectively, thereby making tape applying operation complicate and troublesome. Furthermore, such a structure is complicated and requires large number of parts, thereby increasing to increase manufacturing cost.

On the other hand, when the weather-strip mounting apparatus disclosed in Japanese Patent Application Laying-open No. 2-221582 (1990), Japanese Patent Application Laying-open No. 3-166068 (1991) or Japanese Patent Application Publication No. 5-65298 (1993) is applied for the tape application device, a space becomes necessary for installation of a manipulator in addition for spaces required for holding a door panel and a positioning device. Therefore, the manufacturing line cannot be adapted for further requirement of the space unless modifying the manufacturing line of the automotive vehicle.

SUMMARY OF THE INVENTION

An object of the present invention is to provide a tape application device capable of accurately applying an adhesive tape with a release liner onto a tape application surface formed on a work.

A first aspect of the present invention is a tape application device detachably mounted on a work and applying an adhesive tape removed from a release liner onto a tape application surface formed in the work, comprises:

a main body;

a roller rotatably mounted on the main body and wrapped around the adhesive tape;

locating means mounted on the main body and engaging with the work for holding the main body for movement along the tape application surface so that the roller rotates in a condition depressed onto the tape application surface;

a tape guide plate hinged at a base end portion on the main body for hinged motion about an axis extending perpendicular to a rotation axis of the roller; and fixing means provided between the tape guide plate and the main body for fixing the tape guide plate to the main body so that a gap portion between the tape guide plate and the roller is defined for guiding the adhesive tape with the release liner on the opposite side of the locating means with respect to the roller.

According to the first aspect of the present invention, after fixing the tip end portion of the adhesive tape at the predetermined position of the tape application surface, the main body is engaged and held by the locating means so that the adhesive tape is depressed onto the tape application surface. Then, the adhesive tape is wrapped onto the roller, the position of the tape guide plate relative to the main body is fixed by the fixing means to define the gap portion between the roller and the tape guide plate to position the adhesive tape with the release liner in the gap portion.

From this condition, when the main body is moved along the tape application surface, the adhesive tape is peeled off the release liner to adhere onto the tape application surface.

In the tape application device according to the first aspect of the present invention, the tape application device may further comprise a roller support shaft fixed to the main body at one end portion of the roller support shaft, and the roller is rotatably mounted on the roller support shaft. The roller may have an outer peripheral surface formed of a rubber-like elastic material. The locating means may have a pair of first guide rollers rotatable about rotation axes substantially parallel to the rotation axis of the roller, and a plurality of second guide rollers rotatable about axes intersecting with the rotation axes of the first guide rollers and the rotation axis of the roller. In this case, the work may be caught by the roller and the first guide rollers, and the second guide rollers engage with the work. The fixing means may have a permanent magnet and the tape guide plate is fixed using a magnetic force of the permanent magnet. The work may be a door sash of an automotive vehicle.

A second aspect of the present invention is a tape application device detachably mounted on a work and applying an adhesive tape removed from a release liner onto a tape application surface formed in the work, comprises:

a main body;

a sub-body arranged at a position spaced apart from the main body;

a roller rotatably disposed between the main body and the sub-body, and wrapped around the adhesive tape;

locating means mounted on the main body and engaging with the work for holding the main body for movement along the tape application surface so that the roller rotates in a condition depressed onto the tape application surface;

a tape guide plate hinged at a base end portion on the main body for hinged motion about an axis extending perpendicular to a rotation axis of the roller; and fixing means provided between the tip end portion of the tape guide plate and the main body for fixing the tape guide plate to the main body so that a gap portion between the tape guide plate and the roller is defined for guiding the adhesive tape with the release liner on the opposite side of the locating means with respect to the roller.

According to the second aspect of the present invention, after fixing the tip end of the adhesive tape at the predetermined position of the tape application surface of the work, the adhesive tape is depressed onto the tape application surface by the roller to maintain the main body and the sub-body in engagement with the work by the locating means. Then, the adhesive tape is wrapped around the roller. The position of the tape guide plate relative to the sub-body is fixed to define the gap portion between the roller and the tape guide plate to place the adhesive tape with the release liner in the gap portion.

At this condition, by moving the main body and the sub-body along the tape application surface, the adhesive tape peeled off the release liner is depressed onto the tape application surface by the roller to be adhered onto the tape application surface.

In the tape application device according to the second aspect of the present invention, the tape application device may further comprise a roller support shaft fixed to the main body at one end portion of the roller support shaft and fixed to the sub-body at the other end thereof, the roller supporting shaft couples the main body and the sub-body, and the roller is rotatably mounted on the roller support shaft. The roller may have an outer peripheral surface formed of a rubber-like elastic material. The locating means may have a pair of first guide rollers rotatable about rotation axes substantially parallel to the rotation axis of the roller, and a plurality of second guide rollers rotatable about axes intersecting with the rotation axes of the first guide rollers and the rotation axis of the roller. In this case, the work may be caught by the roller and the first guide rollers, and the second guide rollers engage with the work. The fixing means may have a permanent magnet and the tape guide plate is fixed using a magnetic force of the permanent magnet. The work may be a door sash of an automotive vehicle.

According to the tape application device of the present invention, there is no directionality in a direction to pass the adhesive tape with respect to the roller and the tape guide plate. Namely, the adhesive tape is wrapped around the roller in any direction along the longitudinal direction of the adhesive tape to pass through the gap portion defined between the roller and the tape guide plate. For example, it is applicable for either work of the left and right side. Since the mechanism is simple, production cost can be low.

Furthermore, by forming the locating means depending upon the shape of the work, the tape application device can be constantly engaged with the work without any play. Therefore, the adhesive tape can be accurately attached onto the tape application surface without requiring qualified worker. Particularly, when the locating means is constructed with a pair of the first guide rollers and a plurality of guide rollers, resistance upon moving the tape application device with respect to the work becomes small to require small operation force in the tape applying operation to make the operation easier.

When the outer peripheral surface of the roller is formed with the rubber-like elastic material, it becomes possible to prevent penetration of air to permit attaching of the adhesive tape onto the tape application surface without any irregularity. Furthermore, when the magnetic force is used as the fixing means, the fixing means becomes compact to make opening and closing operation of the tape guide plate quick and easy.

The above and the other objects, effects, features and advantages of the present invention will become more apparent from the following description of embodiments thereof taken in conjunction with the accompanying drawings.

DETAILED DESCRIPTION OF THE PREFERRED EMBODIMENTS

Figure 1:
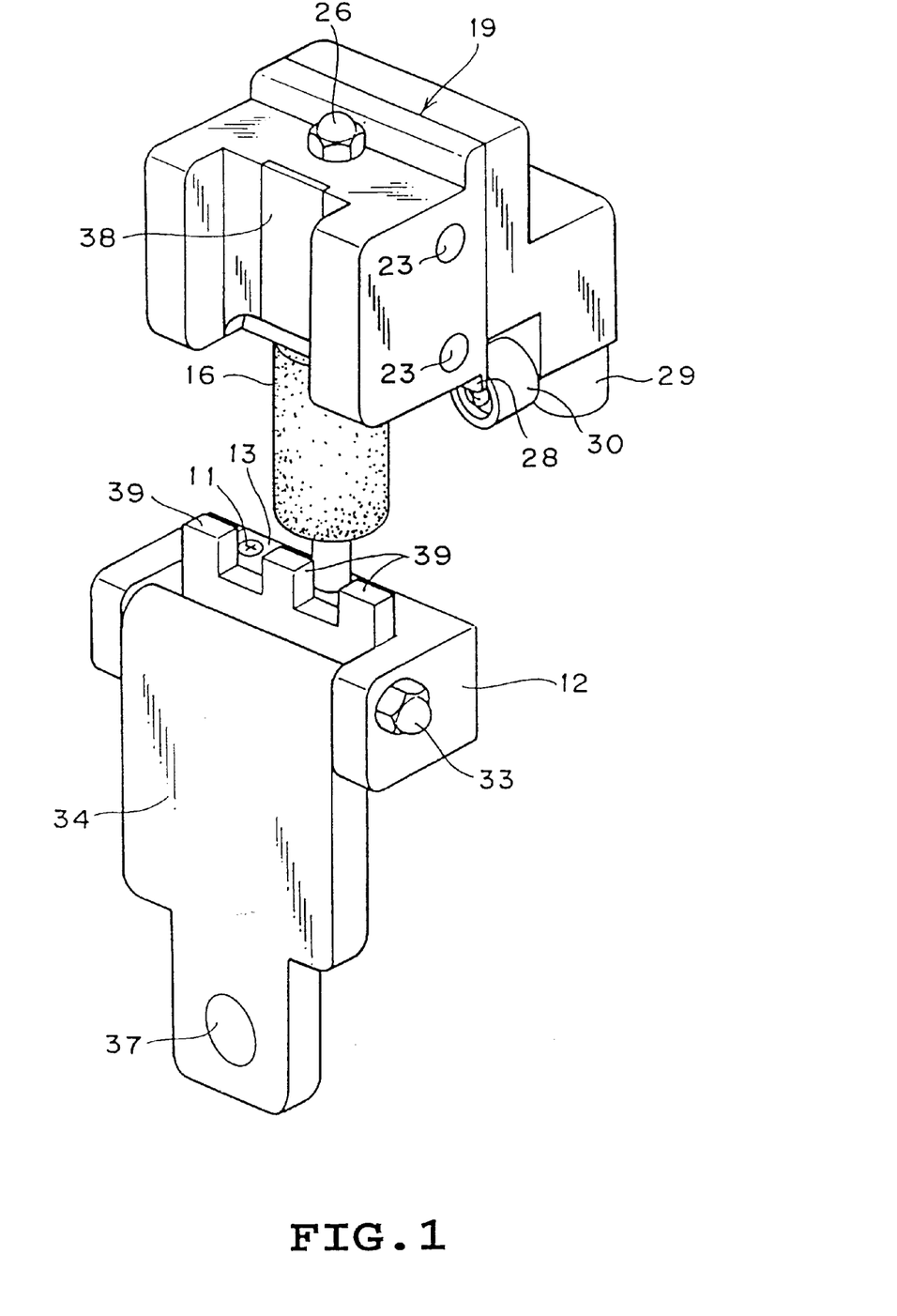
FIG. 1 is a perspective view showing an external appearance of one embodiment, in which a tape application device according to the present invention is applied for a door outer sash of a passenger vehicle.
Figure 2:
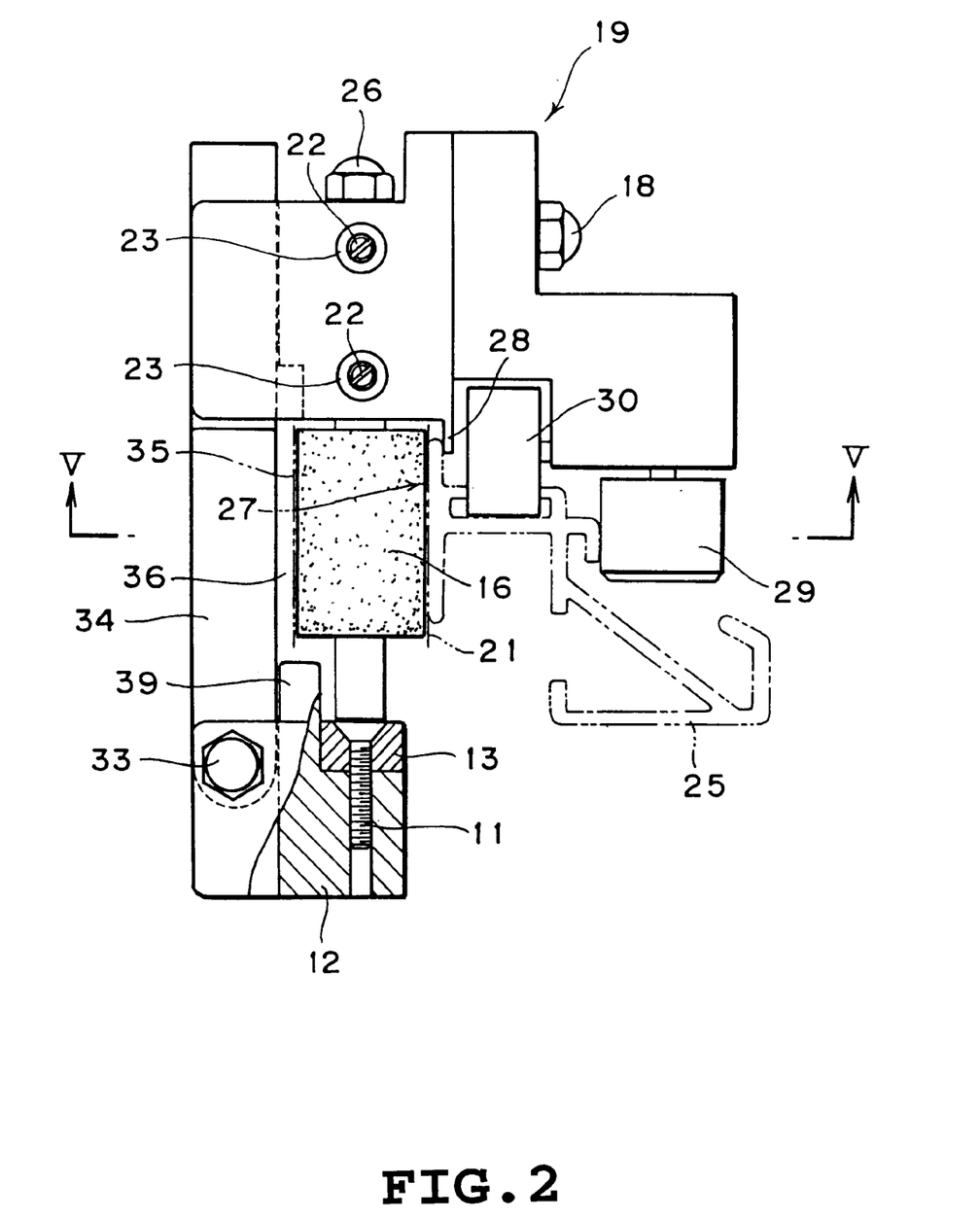
FIG. 2 is a partially sectioned side elevation of the embodiment shown in FIG. 1.
Figure 3:
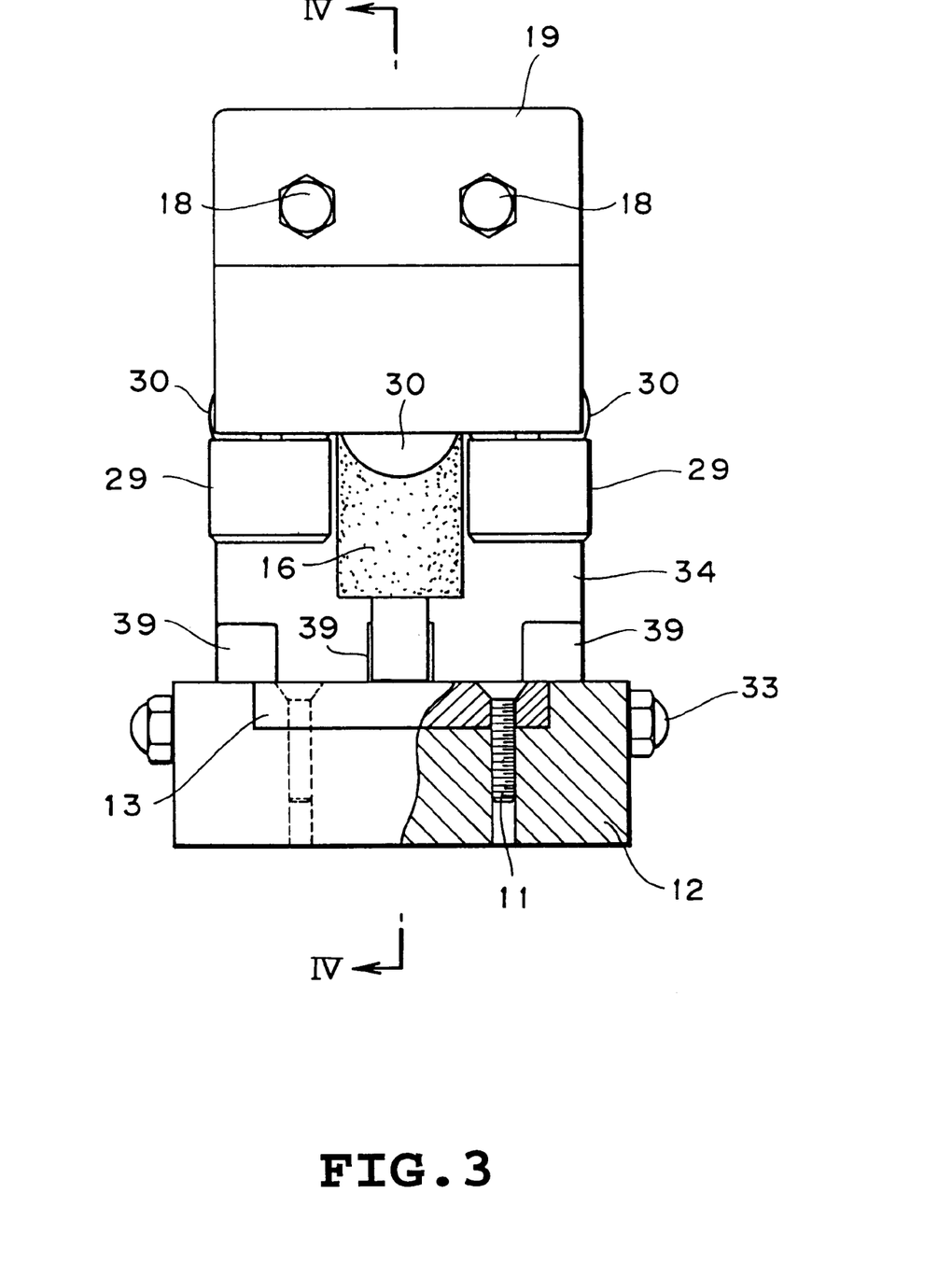
FIG. 3 is a partially sectioned front elevation of the embodiment shown in FIG. 1.
Figure 4:
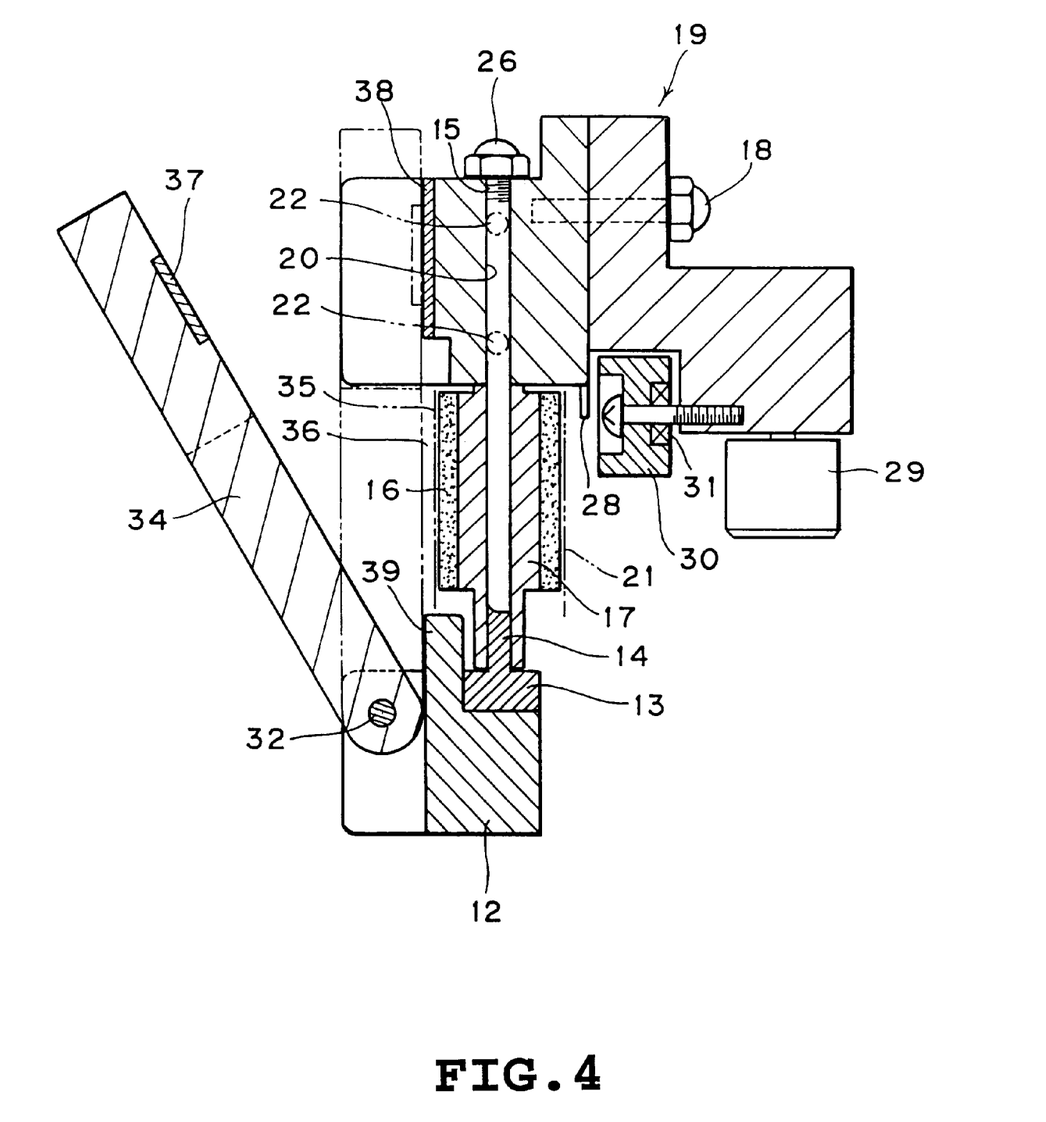
FIG. 4 is a section taken along line IV—IV of FIG. 3.
Figure 5:
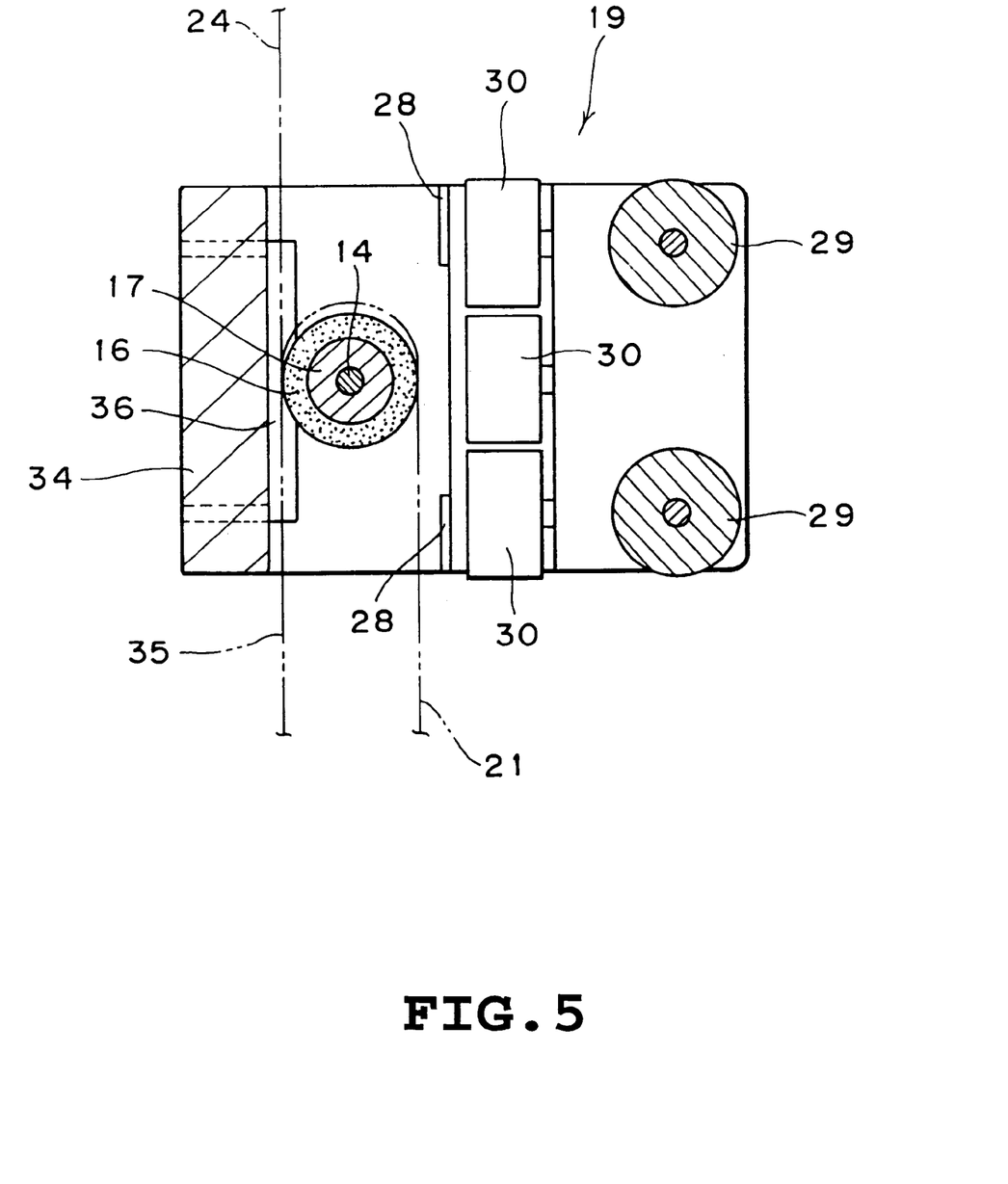
FIG. 5 is a section taken along line V—V of FIG. 2.
Figure 6:
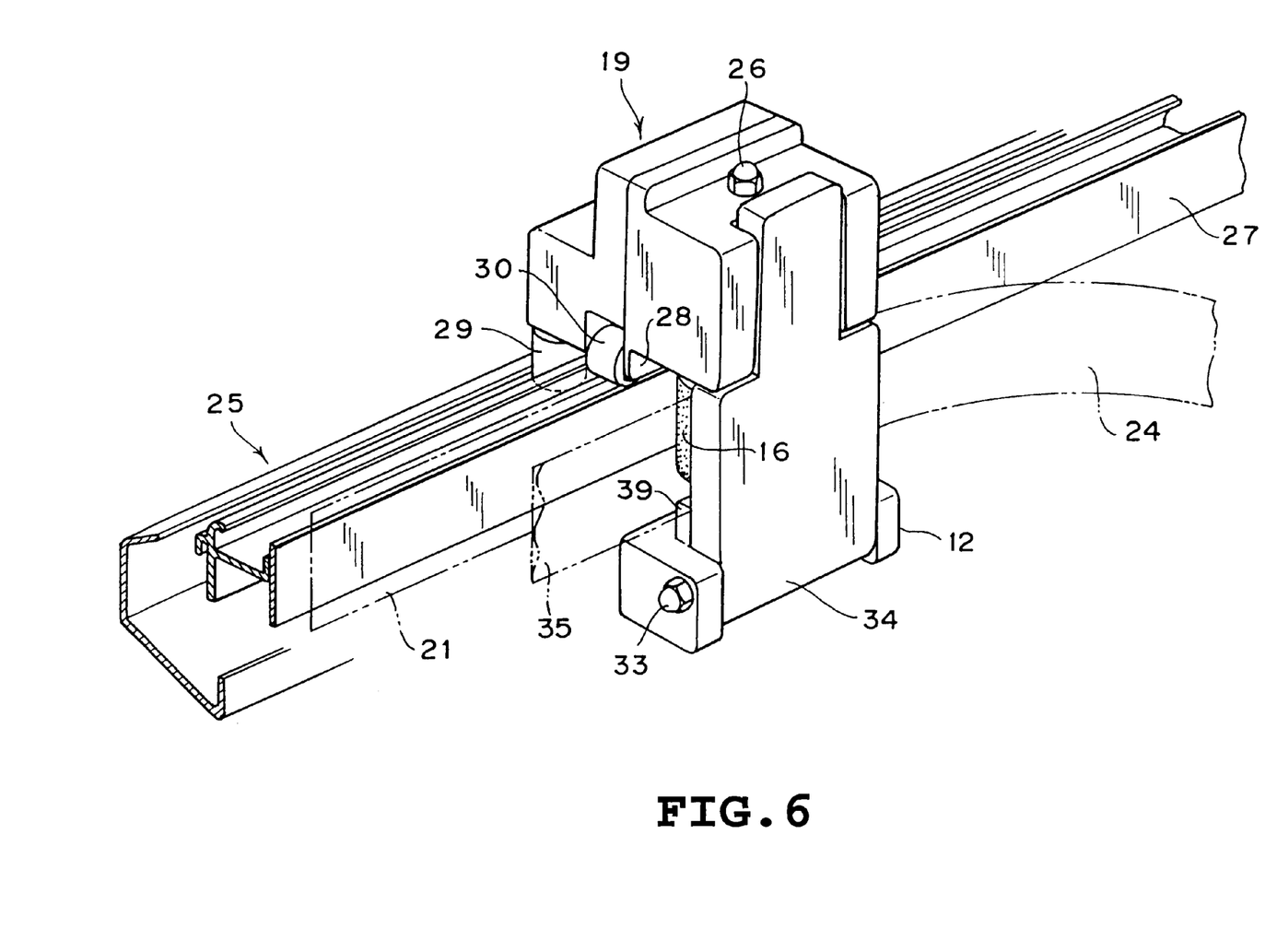
FIG. 6 is a perspective view showing a condition where the tape application device of the embodiment shown in FIG. 1 is coupled with the door outer sash.

One embodiment, in which a tape application device according to the present invention is applied for a front door outer sash or a rear door outer sash of a passenger vehicle, will be explained in detail with reference to FIGS. 1 to 6. Here, FIG. 1 shows an external view of the shown embodiment in a condition where a tape guide plate is opened, FIG. 2 shows a shape of a side surface, FIG. 3 is a shape in a front elevation, FIG. 4 shows a section taken along line IV—IV, FIG. 5 is a section taken along line V—V of FIG. 2, and FIG. 6 shows an external appearance in a condition coupled with a front door outer sash or a rear door outer sash (hereinafter simply referred to as door outer sash) as a work.

Namely, on an end plate 13 fixed on a sub-body 12 by means of a pair of fastening screws 11, one end portion of a roller supporting shaft 14 which extends from the end plate 13 in perpendicular direction, is coupled. On the roller supporting shaft 14 which is formed with a male thread portion 15 on the other hand, a roller 17, outer peripheral surface of which is covered with a rubber-like elastic material 16, is supported in rotatable fashion.

Through a shaft bore 20 formed in a main body 19 which has separated two-piece structure integrally fixed by means of connecting bolts 18, the other end of the roller supporting shaft 14 is extended. In order to properly set a distance between the sub-body 12 and the main body 19 adapting to a length of the roller 17 or a width dimension of an adhesive tape 21 and to couple the sub-body 12 and the main body 19 via the roller supporting shaft 14, at least one (two in the shown embodiment) fastening screw 22 which is abutted on an outer peripheral surface of the roller support shaft 14 at a tip end, is threadingly engaged with a stepped female threaded hole 23 formed in the main body 19 perpendicularly intersecting with the shaft bore 20.

As will be set forth later, in a use condition of the tape application device, an adhesive tape 21 is wrapped over substantially half of the periphery with outwardly orienting an adhesive surface with respect to the roller 17. The release liner 24 holding the adhesive tape 21 becomes a condition drawn from the tape application device along the door outer sash 25.

While the shown embodiment is designed to threadingly engage a cap nut 26 to a male thread portion 15 of the roller supporting shaft 14 extended from the shaft bore 20, it is possible to eliminate the male thread portion 15 and the cap nut 26 by setting a dimension of the roller supporting shaft 14 so as not to extend the tip end thereof from the shaft bore 20. A structure for coupling the sub-body 12 and the main body 19 via the roller supporting shaft 14, is not specified to the structure employed in the shown embodiment but can be of any appropriate known structures, such as serration engagement.

In the main body 19, a pair of lip portions 28 for catching a panel member forming a tape application surface 27 of the door outer sash 25 together with the roller 17, are provided integrally. On the main body 19, a pair of first guide rollers 29 contacting with a side surface on an inner side opposite to the tape application surface 27 of the door outer sash 25 and a plurality of (three in the shown embodiment) second guide rollers 30 engaged with a weather-strip mounting portion of the door outer sash 25 are mounted rotatably. These guide rollers 29 and 30 are assembled with a bearing 31 (see FIG. 4) formed of high density polyethylene in order to reduce wearing associating with movement of the tape application device relative to the door outer sash 25.

These rotation axes of these first guide rollers 29 are set substantially parallel to the roller supporting shaft 14, and rotation axes of these second guide rollers 30 are set substantially perpendicular to the rotation axes of the first guide roller 29 and the roller supporting shaft 14. However, layout of these rotation axes may be set arbitrarily depending upon the shape of the door outer sash 25. Alternatively, when the width and the shape of the door outer sash 25 vary or are differentiated due to different kinds of vehicles, general applicability can be provided to a certain extent by exchanging other shapes and other dimensions of first guide rollers 29 or the second guide rollers 30.

In the shown embodiment, when the tape application device is set on the door outer sash 25 in correct condition as shown in FIG. 2, the door outer sash 25 is clamped between the roller 17 and the first guide rollers 29. In conjunction therewith, the panel member forming the tape application surface 27 of the door outer sash 25 is clamped by means of the roller 17 and the lip portions 28. Then, the roller 17 is abutted onto the tape application surface 27. Thus, the lip portion 28, the first guide roller 29 and the second guide roller 30 function as locating means of the present invention.

In the sub-body 12, both end portions of hinge shaft 32 extending perpendicularly with respect to the roller support shaft 14 and substantially parallel to the tape application surface 27, are threadingly engaged with cap nuts 33. A tape guide plate 34, base end portion of which is pivotable engaged with the hinge shaft 32, is pivotable between an open position shown in FIG. 1 and a close position shown in FIG. 6. The tape guide plate 34 is located on the opposite side of the second guide rollers 30 relative to the roller 17. At the close position of the tape guide plate 34, a gap portion 36 to pass the adhesive tape 35 with the release liner is defined between the tape guide plate 34 and the roller 17. When the tape application device is set on the door outer sash 25 in the normal condition as shown in FIG. 2, the tape guide plate 34 is positioned substantially parallel to the tape application surface 27.

In order to hold the tape guide plate 34 shown in FIG. 2 in the closed position, a permanent magnet 37 is buried in the tip end portion of the tape guide plate 34. In opposition to the permanent magnet 37, a mild steel, or low carbon steel plate 38 is buried in the main body 19. The permanent magnet 37 and the low carbon steel plate 38 form fixing means of the present invention. A magnitude of magnetic force acting between the permanent magnet 37 and the low carbon steel plate 38 should be sufficient to be easily opened by a worker. In addition to the shown embodiment employing the magnetic force as the fixing means, any other fixing means which can hold the tape guide plate 34 at the closed position, may be employed as a matter of course.

In order to prevent the adhesive tape 35 with the release liner passed through the foregoing gap portion 36 along the rotation axis of the roller 17 (vertical direction in FIG. 2), a plurality of projections 39 (three in the shown embodiment) are formed on the sub-body 12. Namely, through the gap portion 36 defined between the upper surfaces of the projecting portions 39 and the lower surface of the main body 19, the adhesive tape 35 with the release liner 24 can be moved.

Accordingly, during actual operation, the tip end portion of the release liner 24 is peeled off the adhesive tape 35 with the release liner. Then, the tip end portion of the adhesive tape 35 is attached at the predetermined position (generally attaching start position) of the flat tape application surface 27 of the door outer sash 25. Thereafter, the first guide rollers 29 and the second guide rollers 30 are engaged with the door outer sash 25 so that the roller 17 of the tape application device, in which the tape guide plate 34 is held in open position as shown in FIG. 1, may depress the tip end portion of the adhesive tape 21 onto the tape application surface 27.

Next, the adhesive tape 21 is wrapped over half of the periphery of the roller 17. Then, the roller 17 is depressed so that the release liner 24 becomes substantially parallel to the tape application surface 27. As shown in FIGS. 2 and 6, the tape guide plate 34 is fixed at the close position.

In this case, in the shown embodiment, by mounting the hinge shaft 32 on the sub-body 12, the tape guide plate 34 in the open position droops downwardly from the sub-body 12. Thus, upon wrapping the adhesive tape 21 onto the roller 17, the worker does not need to hold the tape guide plate 34 in open position to maintain the workability high.

From this condition, with peeling the adhesive tape 21 off the adhesive tape 35 with the release liner, the tape application device is moved toward right in FIG. 6, along the tape application surface 27. Then, the adhesive tape 21 restricted from offsetting with respect to the tape application surface 27 by the gap portion 36, is depressed onto the tape application surface 27 with causing elastic deformation of the roller 17 to be adhered on the tape application surface 27. At the same time, the used release liner 24 is pushed out frontwardly in the direction of motion of the tape application device.

Here, by the first guide rollers 29 and the second guide rollers 30, the main body 19 is engaged with the door outer sash 25 without any play. Furthermore, since these guide rollers 29 and 30 form anti-friction members of low friction coefficient, a frictional resistance upon moving the tape application device along the tape application surface 27 of the door outer sash 25 becomes small to facilitate operation for applying the adhesive tape 21.

In this manner, after attaching the adhesive tape 21 onto the tape application surface 27 of the door outer sash 25, the tape application device is removed from the door outer sash 25. Thereafter, by means of squeezing device (not shown), both end portions in the width direction of the adhesive tape 21 are adhered onto the remaining portion of the door outer sash 25. At this condition, since the adhesive tape 21 is already positioned with respect to the door outer sash 25, operation can be performed without causing any problem.

Since the door outer sash set forth above is normally bilateral symmetric with respect to the vehicle body of the automotive vehicle, the tape application device is applicable by reversing wrapping direction of the adhesive tape 21 with respect to the roller 17 depending upon left or right side and by reversing the direction of motion of the tape application device with respect to the tape application surface 27 of the door outer sash 25, to move toward left in FIG. 6. In this case, the used release liner 24 is pushed out in the forward direction of motion of the tape application device, namely toward left in FIG. 6.

While the main body 19 and the sub-body 12 are integrally fixed with each other via the roller supporting shaft 14 in the foregoing embodiment, it is also possible to form the roller supporting shaft 14 to be supported in cantilever fashion to neglect the sub-body 12.

Figure 7:
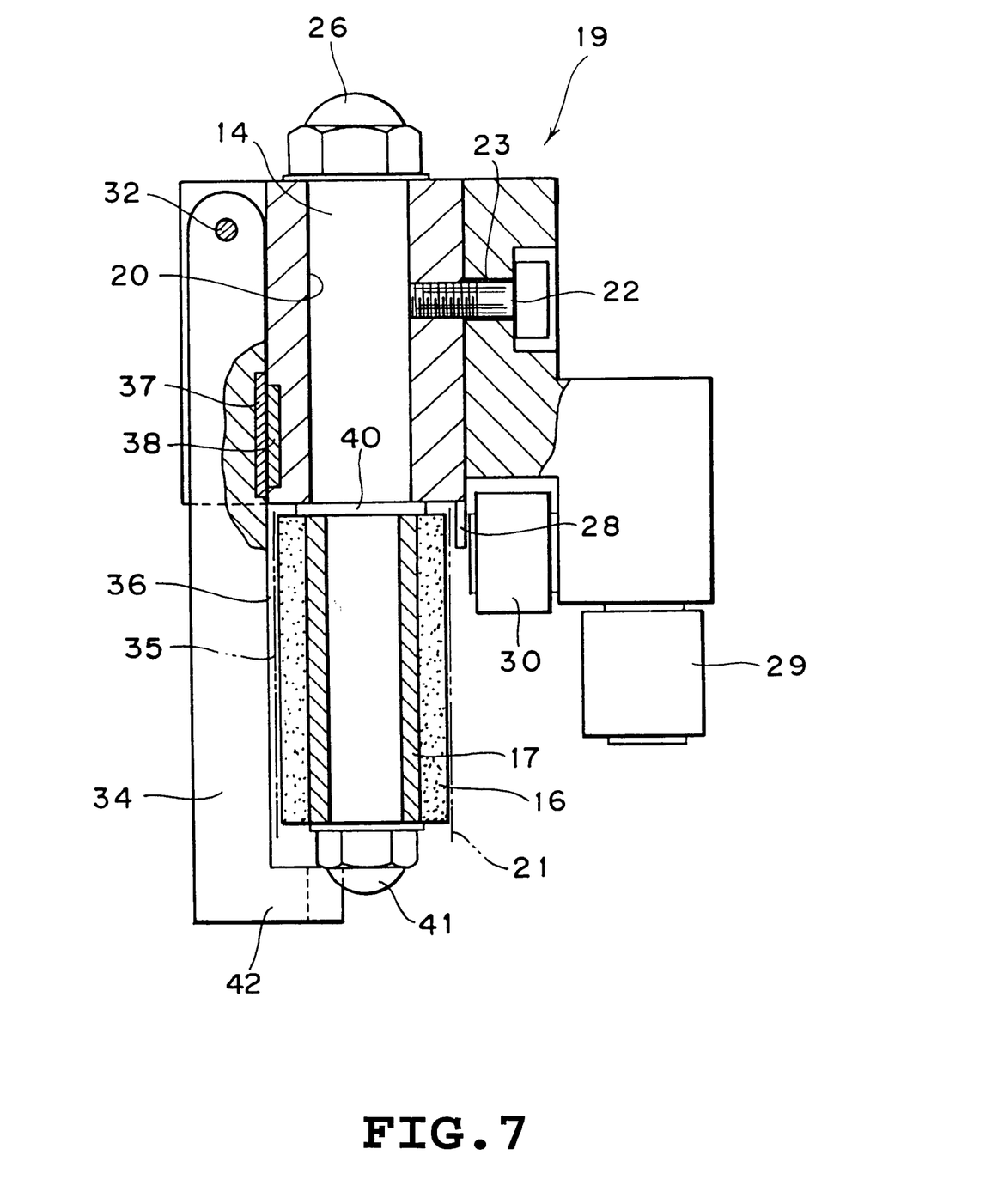
FIG. 7 is a side elevation showing a general construction of another embodiment of the tape application device according to the present invention, illustrated in section.
Figure 8:
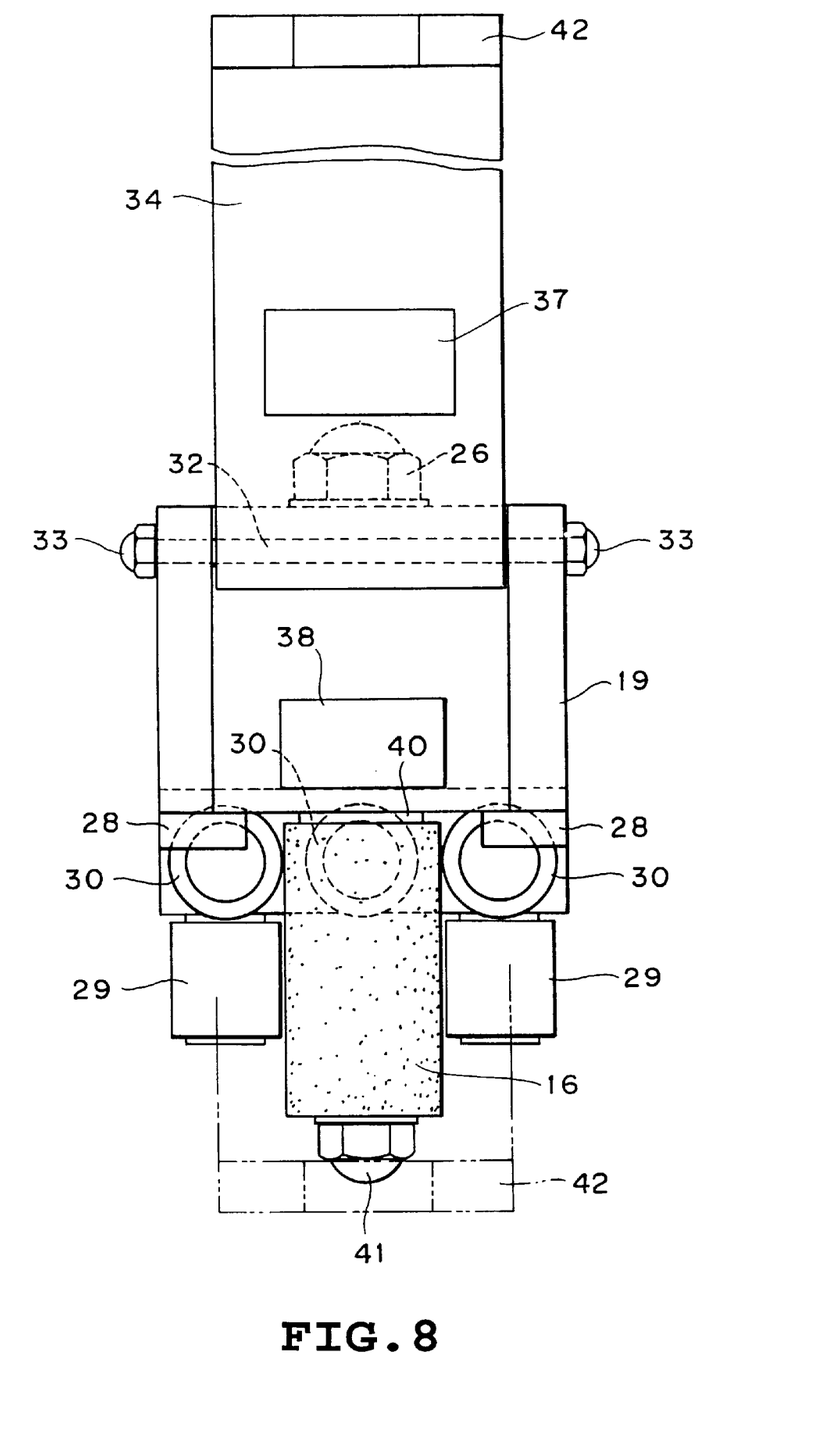
FIG. 8 is a front elevation of the embodiment shown in FIG. 7 illustrated in a condition where a tape guide plate is opened.

Another embodiment of the tape application device according to the present invention is illustrated in FIGS. 7 and 8. The members performing the same functions as those in the former embodiment will be identified by the same reference numerals to avoid redundant disclosure for keeping the disclosure simple enough to facilitate clear understanding of the present invention. Namely, FIG. 7 illustrates a cross-sectional structure of the shown embodiment of the tape application device according to the present invention and FIG. 8 shows a shape in front elevation in a condition where the tape guide plate 34 is in open condition. One end side of the roller supporting shaft 14 which is formed with a flange portion 40 at the center portion thereof, is inserted into the shaft bore 20 and is coupled with the main body 19 by engaging a cap nut 26 therewith. The roller support shaft 14 is prevented from rotating relative to the main body 19 by threading a fastening screw 22 into a stepped female thread hole 23. The roller 17 which is fitted over the other end side of the roller supporting shaft 14, is prevented from loosing off the roller supporting shaft 14 by engaging a cap nut 41 with the other end portion of the roller supporting shaft 14. Thus, the roller 17 is rotatably supported on the roller supporting shaft 14 for rotation thereabout.

The tape guide plate 34 which is pivotably supported on the main body 19 via the hinge shaft 32 at the base end portion, is cooperated with the outer peripheral surface of the roller 17 at its close position shown in FIG. 7 to define the gap portion 36 for holding the adhesive tape 35 with the release liner. In conjunction therewith, in order to prevent the adhesive tape 35 with the release liner from offsetting in a direction parallel to the axis of the roller supporting shaft 14, receptacle portions 42 corresponding to the projecting portions 39 in the former embodiment are formed at the tip end portion.

In the shown embodiment, when the tape guide plate 34 is held in the open position shown in FIG. 8, it is necessary to hold the tape guide plate 34 so as not to rotate into the close position by its own weight. However, the number of parts can be reduced from the former embodiment to enable down-sizing.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A tape application device adapted to be detachably mounted on a work and apply an adhesive tape removed from a release liner onto a tape application surface formed in the work, comprising:

a main body;

a roller rotatably mounted on said main body and wrapped around with the adhesive tape;

a locating device mounted on said main body and engaging with the work for holding said main body for movement along said tape application surface so that said roller rotates in a condition depressed onto the tape application surface;

a tape guide plate hinged at a base end portion on said main body for hinged motion about an axis extending perpendicular to a rotation axis of said roller; and a fixing device provided between said tape guide plate and said main body for fixing said tape guide plate to said main body so that a gap portion between said tape guide plate and said roller is defined for guiding the adhesive tape with the release liner on the opposite side of said locating device with respect to said roller.

2. A tape application device as claimed in claim 1, further comprising a roller support shaft fixed to said main body at one end portion of said roller support shaft, and said roller is rotatably mounted on said roller support shaft.

3. A tape application device as claimed in claim 1, wherein said roller has an outer peripheral surface formed of a elastic material.

4. A tape application device as claimed in claim 1, wherein said locating device has a pair of first guide rollers rotatable about rotation axes substantially parallel to the rotation axis of said roller, and a plurality of second guide rollers rotatable about axes intersecting with the rotation axes of said first guide rollers and the rotation axis of said roller.

5. A tape application device as claimed in claim 4, wherein the work is caught by said roller and said first guide rollers, and said second guide rollers engage with the work.

6. A tape application device as claimed in claim 1, wherein said fixing device has a permanent magnet and said tape guide plate is fixed using a magnetic force of said permanent magnet.

7. A tape application device as claimed in claim 1, wherein the work is a door sash of an automotive vehicle.

8. A tape application device adapted to be detachably mounted on a work and apply an adhesive tape removed from a release liner onto a tape application surface formed in the work, comprising:

a main body;

a sub-body arranged at a position spaced apart from said main body;

a roller rotatably disposed between said main body and said sub-body, and wrapped around with the adhesive tape;

locating means mounted on said main body and engaging with the work for holding said main body for movement along said tape application surface so that said roller rotates in a condition depressed onto the tape application surface;

a tape guide plate hinged at a base end portion on said main body for hinged motion about an axis extending perpendicular to a rotation axis of said roller; and fixing means provided between the tip end portion of said tape guide plate and said main body for fixing said tape guide plate to said main body so that a gap portion between said tape guide plate and said roller is defined for guiding the adhesive tape with the release liner on the opposite side of said locating means with respect to said roller.

9. A tape application device as claimed in claim 8, further comprising a roller support shaft fixed to said main body at one end portion of said roller support shaft and fixed to said sub-body at the other end thereof, said roller supporting shaft couples said main body and said sub-body, and said roller is rotatably mounted on said roller support shaft.

10. A tape application device as claimed in claim 8, wherein said roller has an outer peripheral surface formed of a elastic material.

11. A tape application device as claimed in claim 8, wherein said locating means has a pair of first guide rollers rotatable about rotation axes substantially parallel to the rotation axis of said roller, and a plurality of second guide rollers rotatable about axes intersecting with the rotation axes of said first guide rollers and the rotation axis of said roller.

12. A tape application device as claimed in claim 11, wherein the work is caught by said roller and said first guide rollers, and said second guide rollers engage with the work.

13. A tape application device as claimed in claim 8, wherein said fixing means has a permanent magnet and said tape guide plate is fixed using a magnetic force of said permanent magnet.

14. A tape application device as claimed in claim 8, wherein said work is a door sash of an automotive vehicle.

* * * * *